United States Patent [19]

Soejima et al.

[11] 4,253,992
[45] Mar. 3, 1981

[54] CERAMIC HONEYCOMB COMPOSITE STRUCTURE, CATALYST SUPPORTED THEREBY AND METHOD OF PRODUCING THE SAME

[75] Inventors: Shigeo Soejima; Noboru Yamamoto, both of Nagoya, Japan

[73] Assignee: NGK Insulators, Ltd., Nagoya City, Japan

[21] Appl. No.: 866,765

[22] Filed: Jan. 3, 1978

Related U.S. Application Data

[63] Continuation of Ser. No. 516,790, Oct. 21, 1974, abandoned.

[30] Foreign Application Priority Data

Oct. 3, 1974 [JP]   Japan ............................. 49/113304

[51] Int. Cl.$^3$ .................. B01J 35/04; B01J 35/10; F01N 3/15; F01N 3/16
[52] U.S. Cl. .................. 252/477 R; 60/299; 60/301; 60/302; 156/89; 428/116; 428/118
[58] Field of Search .................. 23/288 F, 288 FC; 156/89; 252/477 R; 428/116, 118; 60/299, 301, 302

[56] References Cited
U.S. PATENT DOCUMENTS

| | | | |
|---|---|---|---|
| 3,554,929 | 1/1971 | Aarons | 252/477 R |
| 3,755,204 | 8/1973 | Sergeys | 252/477 R |
| 3,799,796 | 3/1974 | Hunter | 252/477 R |
| 3,839,224 | 10/1974 | Yonehara et al. | 252/477 R |

*Primary Examiner*—James C. Cannon
*Attorney, Agent, or Firm*—Balogh, Osann, Kramer, Dvorak, Genova & Traub

[57] ABSTRACT

A ceramic honeycomb composite structure adapted to be used as a catalyst support comprises a ceramic honeycomb body and ceramic layers integrally provided thereon having surfaces including therein microscopic holes, a sum of volumes of the holes 5 microns or more being at least 0.1 cm$^3$/g to ensure a sufficient catalyst-supporting property and achieve a high mechanical strength of the structure. On the layers of the structure are provided active material layers onto which a catalytic component is applied to enable it to be used as a catalyst. A ceramic material is extruded through a die to form the ceramic honeycomb body to which is applied ceramic grains and then the body with the grains is dried and sintered to complete the composite structure.

8 Claims, 8 Drawing Figures

FIG_1A
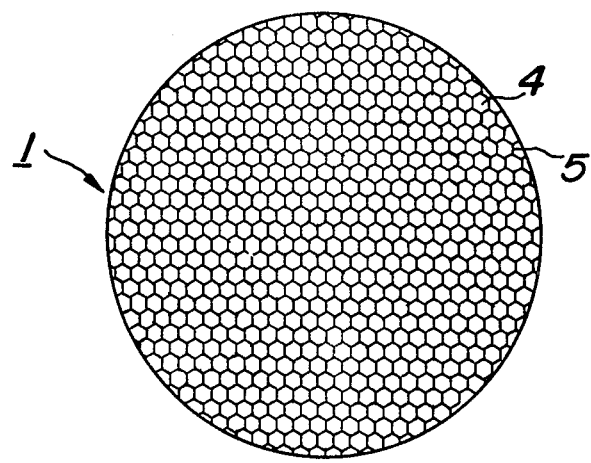
FIG_1B
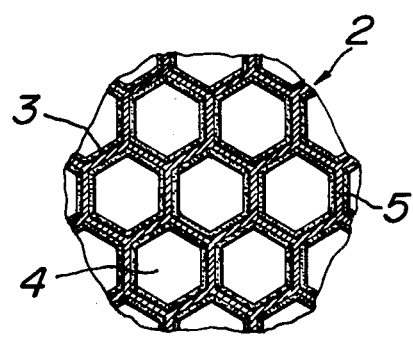

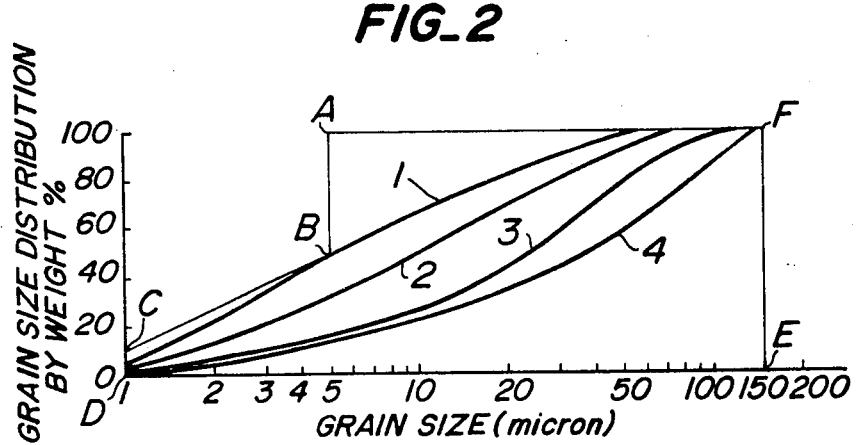

FIG_3A
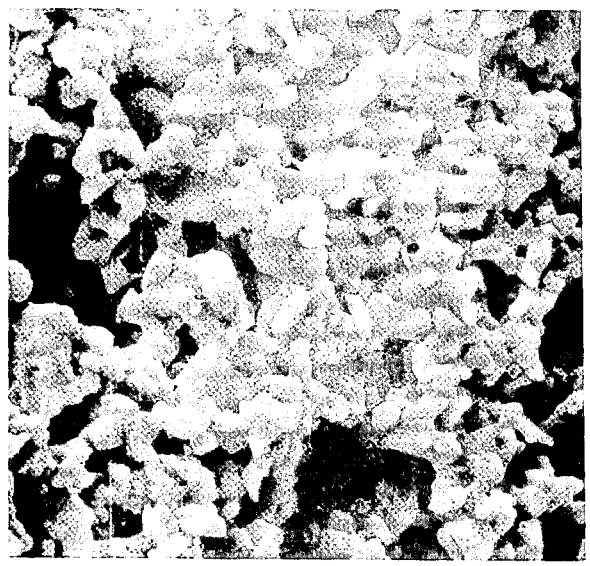
10μ
FIG_3B
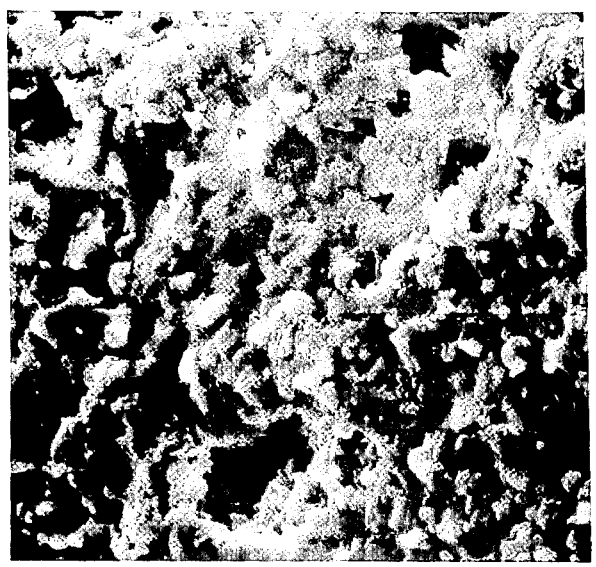
10μ

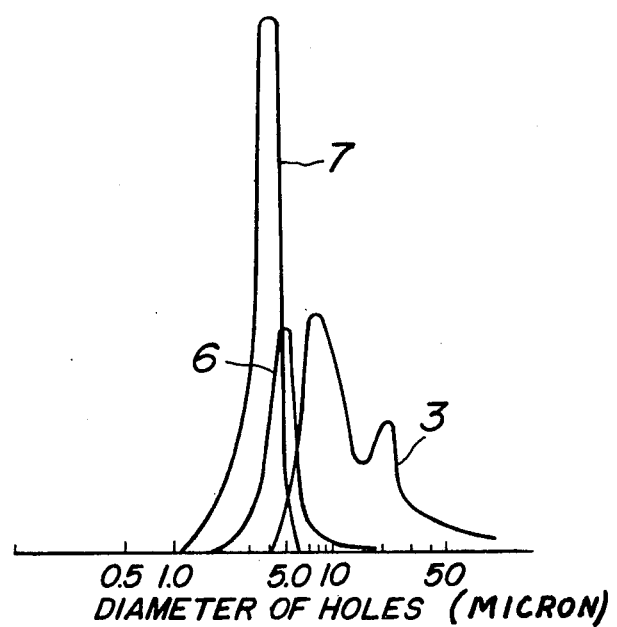
FIG_4A
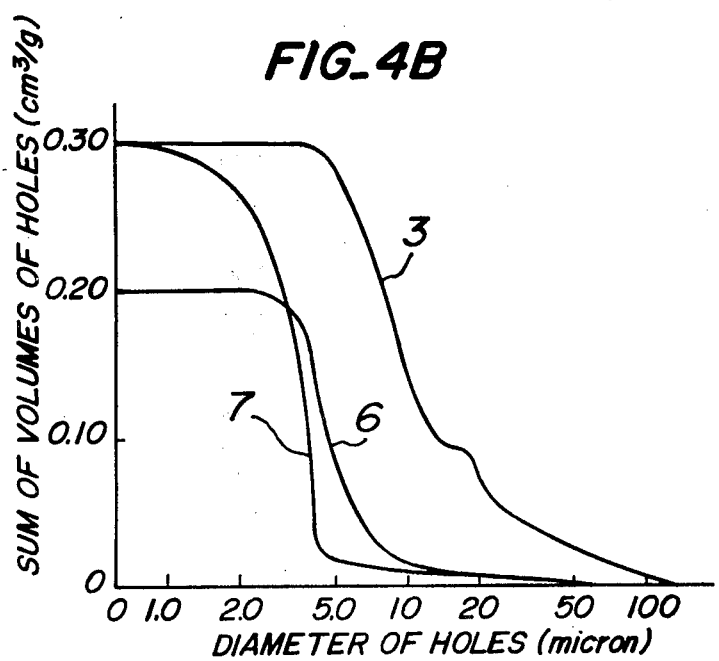
FIG_4B

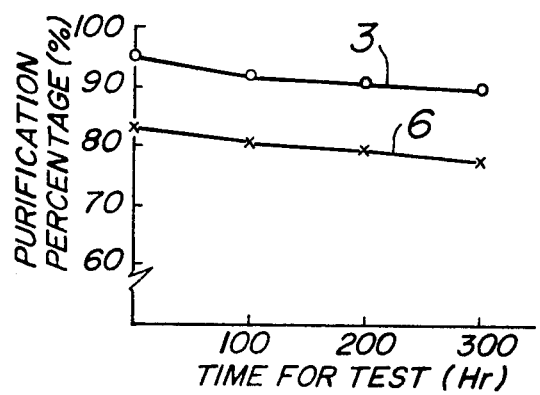
FIG_5

CERAMIC HONEYCOMB COMPOSITE STRUCTURE, CATALYST SUPPORTED THEREBY AND METHOD OF PRODUCING THE SAME

This is a Continuation of application Ser. No. 516,790 filed Oct. 21, 1974, and now abandoned.

BACKGROUND OF THE INVENTION

The invention relates to a ceramic honeycomb composite structure and more particularly a new and improved ceramic honeycomb composite structure, a catalyst supported thereby and a method of producing the same wherein the composite structure is further provided thereon with active material layers onto which is applied catalytic component to form the catalyst.

Various methods have been known for producing ceramic honeycomb structures having useful applications as catalyst supports. Typical of them is the extrusion method using a die through which ceramic material is extruded to form the honeycomb structure. In other typical method, corrugated flexible ceramic green sheets are laminated or piled and then sintered to form the honeycomb structure.

The support for a catalyst used for purifying, for example, an outlet exhaust gas from an internal combustion engine mounted on a motor vehicle is required to have not only a high mechanical strength but also a sufficient catalyst-supporting property which greatly affect a possible durability of the catalyst. However, it is in effect difficult to obtain such a catalyst which has a high mechanical strength and a sufficient catalyst-supporting property, because a catalyst support which is of high density for the purpose of increasing its mechanical strength has only a poor catalyst-supporting property owing to its smooth surfaces. On the other hand a catalyst support which is of low density for the purpose of increasing its catalyst-supporting property has generally only a low mechanical strength. Particularly, a catalyst support made in the extrusion method which is useful to obtain ceramic honeycomb structures inherently exhibits a grain orientation in the surfaces in parallel with its extruded direction to provide smooth surfaces resulting in a poor catalyst-supporting property.

SUMMARY OF THE INVENTION

The invention provides the catalyst support having a high mechanical strength and a sufficient catalyst-supporting property by utilizing as a support a ceramic honeycomb body having a high mechanical strength made in for example the extrusion method using a die and applying to its surfaces relatively coarse surface layers to form integral coarse layers in order to overcome the disadvantages of the prior art above described. The ceramic honeycomb composite structure according to the invention thus comprises ceramic surface layers having relatively coarse surfaces integrally provided on a relatively high dense or high strength ceramic honeycomb body. The ceramic honeycomb composite structure is then provided thereon with active material layers onto which is applied a catalytic component to enable it to be used as a catalyst.

It is therefore a primary object of the invention to provide an improved ceramic honeycomb composite structure.

It is another object of the invention to provide a catalyst support having a high mechanical strength and a sufficient catalyst-supporting property.

It is other object of the invention to provide a catalyst supported by such a ceramic honeycomb composite structure.

It is further object of the invention to provide a method of producing the ceramic honeycomb composite structure or catalyst support and a catalyst supported thereby.

The invention will be more fully understood by referring to the following detailed specification and claims taken in connection with the appended drawings.

BRIEF DESCRIPTION OF THE DRAWINGS

FIG. 1A is a cross section of an embodiment of the ceramic honeycomb composite structure according to the invention;

FIG. 1B is an enlarged partial diagrammatic view of the structure shown in FIG. 1A;

FIG. 2 illustrates ranges of grain size distribution with a logarithmic abscissa suitable but not exclusive for ceramic layer material for use in the catalyst support according to the invention;

FIG. 3A is a scanning electron microscopic photograph of a surface condition of the composite structure with ceramic layers according to the invention;

FIG. 3B is a scanning electron microscopic photograph of a surface condition of a honeycomb body without ceramic layers;

FIG. 4A is a graph using a logarithmic abscissa showing a relationship between distribution of diameters of holes and sum of volumes of the holes of each sample used in the embodiment described later;

FIG. 4B is a graph using a logarithmic abscissa illustrating the relationship as shown in FIG. 4A, in a cumulative curve; and FIG. 5 is a graph illustrating durabilities of catalysts used in the embodiment described later.

DESCRIPTION OF THE PREFERRED EMBODIMENTS

Referring first to FIGS. 1A and 1B, the ceramic honeycomb composite structure 1 according to the invention consists of a honeycomb structure body 2 and ceramic layers 3 integrally provided thereon.

The body 2 is formed in the extrusion method using a die through which is extruded uniformly mixed extrudable ceramic material including any organic binder and/or water. The body 2 is a thin-walled structure having a multiplicity of parallel channels 4 extending therethrough and separated by thin walls 5. The body 2 is preferably produced in the extrusion method, but may of course be made in any other methods. Material for the body 2 may be oxide ceramics, carbide ceramics or nitride ceramics. Typical examples of the oxide ceramics are cordierite, mullite and alumina materials or usual ceramic material as clay or the like. Examples of carbide and nitride ceramics are silicon carbide material and silicon nitride material. A material which changes into these materials when being fired may of course be used as starting material. Moreover, although the shape of the channels 4 in crosssection is shown hexagonal, it may be square, rectangular, triangular or any other shapes such as circular as the case may be and shapes of the channels of the body 2 may be made different from each other. The thin walls 5 are shown uniform in thickness in FIG. 1B, but they may not always be uniform. In addition, the entire configuration of the body 2 may be varied depending upon its practical application other than the sectional shape as shown in FIG. 1A.

The ceramic layers 3 integrally provided on the body 2 have coarse surfaces with numberless microscopical holes. When the composite structure 1 according to the invention is used as a catalyst support, it is important for the layer 3 to have a good supporting property which is able securely to support an active material layer further provided on the layer 3. The present invention lies in such a layer which enables the catalyst to improve its action as a catalyst and assists the body 2 in supporting the catalyst effectively to ensure that the durability of the catalyst can be increased. It has been found that the improvement of the catalyst property and the supporting property of the body 2 is achieved by the layers 3 having surfaces which are coarse to an extent such that the surfaces of the layer includes numberless fine holes and a sum of volumes of the holes of which diameters are not less than 5 microns is at least 0.1 cm$^3$/g. It has also been found that the maximum value of the sum of volumes of the holes of which diameters are not less than 5 microns is preferably 0.6 cm$^3$/g.

In order for the layers 3 to be integrally provided on the body 2, a green or fired body 2 is preferably dipped in a ceramic slurry at least one time and thereafter dried and sintered. For this purpose, however, any other methods may be employed, for example, spraying of ceramic powder onto the body 2. Whether a green honeycomb body or calcined one should be dipped is often determined depending upon a kind of binder or the like used for the body 2.

It is preferable that ceramic grains of such a slurry or powder have a grain size distribution within a range defined by lines A-B-C-D-E-F as shown in FIG. 2. Examples such grain size distributions are shown in curves 1-4 in FIG. 2. Thus acceptable grain size distributions of ceramic materials for constituting the layer 3 range within the area defined by the lines A-B-C-D-E-F, that is, from the coarsest one including only grains of 150 microns as shown in the line E-F to the finest one as shown in the lines A-B-C-D which includes grains of approximately 10% by weight of 1 micron or less, 27% by weight of 2 microns or less, 37% by weight of 3 microns or less, 44% by weight of 4 microns or less and 100% by weight of 5 microns or less, among which grains of 5 microns are 50% by weight.

If desired, an adjustment of viscosity and/or stirring of the slurry may be employed to suspend grains sufficiently in the slurry. It is preferable to repeat the dipping of the body a plurality of times to deposit ceramic grains to the surfaces of the body 2 uniformly and sufficiently, although only one dipping may be often used.

The body 2 provided with sufficient ceramic grains from a slurry or powder having a grain size distribution within the above described is then dried and sintered at a temperature from 800° to 2,000° C., preferably 1,200° to 1,500° C. or preferably 1,300° to 1,400° C. when the body or the ceramic layer is cordierite. In this manner the honeycomb composite structure according to the invention is obtained, of which coarse surfaces have numberless fine holes, a sum of volumes of the holes of 5 microns or more being at least 0.1 cm$^3$/g. In the case, by proper selections or controls of grain sizes for the layer 3 within the range defined by the lines A-B-C-D-E-F as shown in FIG. 2, it can obtain composite structures 1 having surfaces of various roughnesses while fulfilling the condition of at least 0.1 cm$^3$/g sum of volumes of holes of 5 microns or more.

It is clearly evident that the surfaces of the composite structure according to the invention are remarkably coarser than those of structures having no ceramic layers in comparison of the scanning electron microscopic photograph in FIG. 3A illustrating a surface of the composite structure provided with the ceramic layers according to the invention with that in FIG. 3B illustrating a surface of a body having no ceramic layers thereon. The ceramic layer and the honeycomb bodies shown in FIGS. 3A and 3B are made of a cordierite material having a grain size distribution as shown in the curve 3 in FIG. 2 and sintered at 1,340° C.

The layers 3 may be integrally provided on all over the surfaces of the composite body 2, but may be integrally provided at least on the thin walls 5 surrounding the channels 4. The layer 3 may be made of the material for constituting the composite body 2 as above described. In the case, it is preferable to make the layer 3 and the body 2 of the same kind of material, for example, the cordierite, although it is not always absolutely necessary. A material which changes into these materials when being fired may of course be used as a starting material.

The ceramic honeycomb composite structure of the invention is subjected to an additional process to provide a catalyst. The catalyst according to the invention consists of an active material layer (not shown) provided on the composite structure 1 and a catalytic component (not shown) applied to or integrally provided on the active material layer. The active material layer is made of a material, for example, alumina and/or magnesia which has been applied to the layers in the form of, for example, a slurry and then dried and calcined. For the purpose, the alumina is preferable and particularly gamma alumina is best for the active material. The active material is generally of a very great surface area per unit weight thereof within in the order of 20–300 m$^2$/g which is 200–3,000 times as great as that of the layer 3 which is generally in the order of 0.1 m$^2$/g. Examples of the catalytic component applied to or impregnating the active material layers to form a unitary structure are copper, nickel, cobalt, platinum group metals, iron, manganese, rhenium, chromium, molybdenum, tungsten, vanadium, niobium and the like, among which copper, nickel, iron, chromium and platinum group metals are particularly preferable. These catalytic components are applied to the above active material layers in any conventional methods in the art. In carrying out the invention, various kinds of salt or any combinations of salts may be used as the catalytic component.

EXAMPLE

A mixture comprising following compositions was prepared.

| | |
|---|---|
| cordierite[1] | 100 parts by weight |
| water | 5 parts by weight |
| starch[2] | 20 parts by weight |

[1] A grain size distribution as shown in the curve 3 in FIG. 2 and an approximately 25 microns average grain size.
[2] For example, a paper adhesive containing about 80% by weight of water, available under the trade mark "Fueki-Nori" in Japan.

The mixture was sufficiently kneaded in a kneader and extruded from a die mounted on a de-airing extruder to form a honeycomb structure having hexagonal channels in section as shown in FIG. 1A. The structure was severed into pieces of 76.2 mm length which was dried and then calcined at 1,000° C. for two hours. The calcined body was dipped one time into a slurry composed of 100 parts by weight of cordierite having a grain size distribution shown in the Tests Nos. 1-4 in Table 1, 100 parts by weight of water and 3 parts by weight of carboxymethylcellulose to deposit the cordierite grains enough on all over the surfaces of the body. The body taken out of the slurry was dried and then sintered at 1,400° C. for three hours to provide a composite structure according to the invention. The Table 1 shows at Tests Nos. 1-4 average fine hole diameters in the surfaces of thin walls, sums of volumes of all the holes, sums of volumes of the holes of 5 microns or more and compressive strengths of the composite structure.

The Tests Nos. 5-7 in Table 1 show results of other honeycomb bodies sintered at 1,400° C. for three hours which were not dipped in a slurry. FIG. 4A illustrates relations between distributions of diameters of holes and sums of volumes of the holes of the final products obtained in the Tests Nos. 3, 6 and 7. Curves 3, 6 and 7 in FIG. 4A correspond to the Tests Nos. 3, 6 and 7, respectively. An area surrounded by each curve and an abscissa in FIG. 4A indicates the sum of volumes of holes of each samples of the Test. In the sample of Test No. 6, for example, the sum of volumes of all the holes is 0.20 cm$^3$/g as shown in Table 1, so that the area defined by the curve 6 and the abscissa in FIG. 4A indicates 0.20 cm$^3$g. When the area is divided by a line passing through the point of 5 microns perpendicular to the abscissa into two areas on the right and left of the vertical line, the area on the right side is slightly less than that on the left side of the line. It is to be understood that the area on the right side which corresponds to the sum of volumes of the holes 5 microns or more indicates 0.08 cm$^3$g according to Table 1. (Therefore, the area on the left side which corresponds to the sum of volumes of the holes less than 5 microns indicates 0.12 cm$^3$/g.) In consideration of the position of the peak in the curve 6 in FIG. 4A, it is evident that the holes in the order of 4 microns are most of the other holes of the sample of Test No. 6. FIG. 4B indicates FIG. 4A in a different manner which clearly shows a sum of volumes of holes which are of a specified diameter or less.

These final products Nos. 1-6 were dipped into slurry baths comprising 5 parts by weight of colloidal aluminum hydroxide, 95 parts by weight of aluminum hyroxide and 300 parts by weight of water, and were dried and kept at 500° C. for two hours to form active material layers of gamma alumina calcined thereon. The surface area per unit weight of the gamma alumina layer was 120 m$^2$g. The gamma alumina layers were impregnated with chloroplatinic acid and then dried. Thereafter, the final products were subjected to heat treatment at a temperature of 500°-600° C. to provide catalysts to be used.

Purification tests of the thus obtained catalysts were carried out with outlet exhaust gases from an internal combustion engine. In these tests, a ratio in percentage of a reduced amount of hydrocarbon in the exhaust gas which has passed through the catalyst to an amount of hydrocarbon in the same gas which has not passed through the catalyst is referred to as "purification percentage". The values of the measured purification percentages are shown in Table 1 and values of Tests Nos. 3 and 6 are in curves 3 and 6 in FIG. 5. As can be seen from the Table 1 and FIG. 5, the catalysts supported by the structure bodies 2 having the layers 3 integrally provided thereon according to the invention are substantially 10% higher in initial purification percentage than the catalysts supported on the active material layers of gamma alumina by the structures without arranging the layers 3 between the body 2 and the active material layers. The tests Nos. 3 and 6 were continued for 300 hours of which results are shown in the curves 3 and 6 in FIG. 5. It has also been found that the catalyst according to the invention as shown in the curve 3 exhibits a high purification percentage even after 300 hours than the initial purification percentage of the catalyst of Test No. 6. The bodies used in these tests had dimensions of 118.4 mm overall diameter, 1 mm length of one side of a hexagonal unit, 0.3 mm wall thickness, about 70% open frontal area in section and 20 cm$^2$/cm$^3$ geometrical surface area.

TABLE 1

| Test No. | Average grain size of coated powder (micron) | Average diameter of holes (micron) | Sum[1] of volumes of total holes (cm$^3$/g) | Sum[1] of volumes of holes 5 microns or more (cm$^3$/g) | Compressive strength[2] of honeycomb body (Kg/cm$^2$) | Purification percentage[3] for hydrocarbon (%) |
|---|---|---|---|---|---|---|
| 1 | 5[4] | 5 | 0.26 | 0.12 | 500 | 90 |
| 2 | 10[5] | 8 | 0.28 | 0.20 | 500 | 93 |
| 3 | 25[6] | 12 | 0.30 | 0.28 | 500 | 95 |
| 4 | 40[7] | 20 | 0.32 | 0.30 | 500 | 95 |
| 5 | — | 4 | 0.22 | 0.08 | 500 | 82 |
| 6 | — | 4 | 0.20 | 0.08 | 350 | 83 |
| 7 | — | 3.5 | 0.30 | 0.02 | 250 | 80 |

[1] As measured by CARLO ELBA Mercury Pressure Porosimeter, Model 70H.
[2] Measured in a direction parallel to channels of honeycombs.
[3] Initial values.
[4] Illustrated in curve 1 in FIG. 2.
[5] Illustrated in curve 2 in FIG. 2.
[6] Illustrated in curve 3 in FIG. 2.
[7] Illustrated in curve 4 in FIG. 2.

What is claimed is:

1. A catalyst comprising a honeycomb structure body having a multiplicity of parallel channels separated by thin walls, ceramic grains layers the surfaces of which contain pores and the sum of volumes of the pores, having a diameter of at least 5 microns, is 0.1 to 0.6 cm$^3$/g integrally provided at least on said walls, active material layers provided on said ceramic grains layers and catalytic component applied to said active material layers.

2. A catalyst as set forth in claim 1, wherein said body and said ceramic grains layers are made of the same kind of ceramics.

3. A catalyst as set forth in claim 2, wherein said body and said ceramic grains layers are both made of cordierite ceramics.

4. A catalyst as set forth in claim 1, wherein said active material is at least one material selected from the group consisting of alumina and magnesia.

5. A catalyst as set forth in claim 4, wherein said active material is alumina.

6. A catalyst as set forth in claim 5, wherein said alumina is gamma alumina.

7. A catalyst as set forth in claim 1, wherein said catalytic component is at least one material selected from the group consisting of copper, nickel, cobalt, platinum group metals, iron, manganese, rhenium, chromium, molybdenum, tungsten, vanadium and niobium.

8. A catalyst as set forth in claim 7, wherein said catalytic component is at least one selected from the metallic group consisting of copper, nickel, iron, chromium and platinum group metals.

* * * * *